Nov. 24, 1942.    W. A. LANDRUM    2,302,872
STOP REQUEST SYSTEM FOR PUBLIC CONVEYANCES
Filed June 22, 1940    2 Sheets-Sheet 1
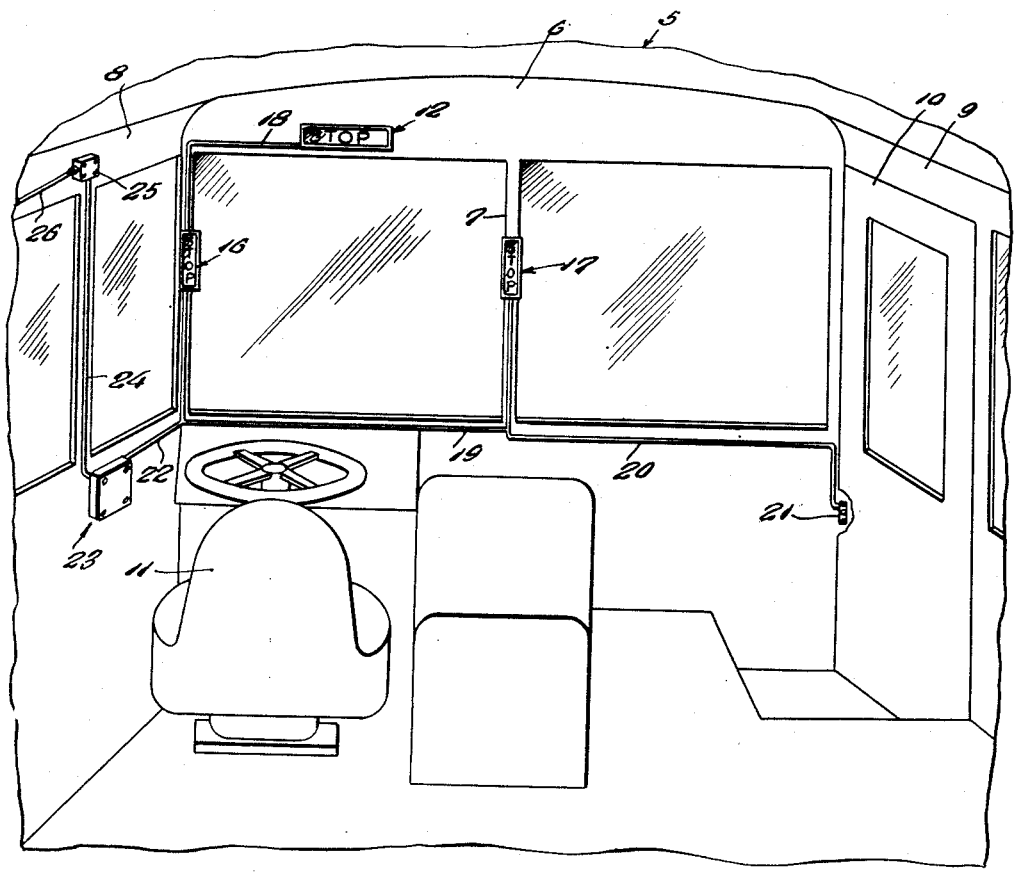
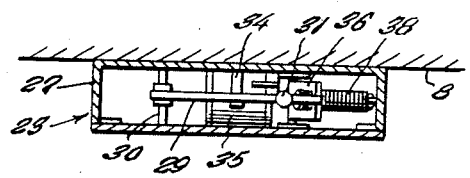
Inventor
Wiley A. Landrum
By Clarence A. O'Brien
Attorney Patented Nov. 24, 1942

2,302,872

UNITED STATES PATENT OFFICE 2,302,872

STOP REQUEST SYSTEM FOR PUBLIC CONVEYANCES

Wiley A. Landrum, Hattiesburg, Miss.

Application June 22, 1940, Serial No. 341,949

2 Claims. (Cl. 177—352)

My invention relates to a stop request system for public conveyances, such as busses, street cars, and the like, and the primary object of my invention is to provide an arrangement whereby the wish of a passenger to alight from the conveyance may be unmistakably signaled to the driver of the conveyance without noise which would disturb other passengers, and wherein the incidence of the signal to the driver is made evident to the person signaling or making the request for the stop thereby assuring such person that the driver has been properly signaled.

Other important objects and advantages of the invention will be apparent from a reading of the following description taken in connection with the drawings, wherein for purposes of illustration I have shown a preferred embodiment of my invention.

In the drawings:

Figure 1 is a fragmentary elevational view of the interior of the driver compartment of a bus or the like showing the signaling devices in accordance with the present invention positioned therein.

Figure 2 is a general schematic wiring diagram showing the electrical elements and their connections.

Figure 3 is an enlarged fragmentary transverse sectional view taken through the passenger informing stop signal.

Figure 4 is a perspective view of a spring retracted armature of the magnetic switch.

Figure 5 is a horizontal sectional view taken through Figure 2 approximately on the line 5—5 and looking downwardly in the direction of the arrows.

Referring in detail to the drawings, and first to Figure 1, the numeral 5 generally designates the windshield equipped front of the bus or the like public conveyance which includes the header board 6 and the center post 7, with a side wall 8 and a right hand side wall 9 equipped with a front door 10, with the driver's seat 11 behind the left hand part of the windshield equipped front of the bus or the like. Mounted at a suitable elevation on the header board 6 so as to be within the view of substantially all of the passengers on the bus, is a passenger informing stop signal 12 which comprises a suitable casing 13 mounted to the header board and provided with a properly marked translucent or transparent front 14, with suitable electric bulb or bulbs 15 mounted therein to illuminate the front and show the word "stop" thereon. The driver informing signals are 16 and 17, the signal 17 being mounted on the center post 7 and the signal 16 on the side portion of the front of the bus or the like, so as to be on opposite sides of the field of vision of the driver. With this arrangement the chance is eliminated that the driver may miss a single signal or confuse it with other lights, especially at night in heavy traffic in well-lighted areas, and fail to be apprised of the wish of a passenger to halt the bus or the like and leave the same. Each signal comprises a suitable casing similar to that shown in Figure 3 of the drawings to show "Stop" when illuminated. A suitable conduit 18 containing the necessary wire or wires leads from the passenger informing stop signal 12 to the driver informing stop signal 16 and a branch 19 of this conduit leads across to the driver informing signal 17 and a branch 20 leads along the bottom of the windshield to the door switch 21, 21' to be described. A further branch 22 of the said conduit leads to the magnetic switch which is generally designated 23 which is conveniently mounted on the side wall 8 below the window level and next to the driver's seat 11. From the magnetic switch 23 leads a conduit 24 which enters the cord pull switch 25 which is mounted on the upper part of the side 8 of the bus or the like with the operating cord 26 leading back along the side of the bus or the like and through the passenger compartment.

The magnetic switch comprises a suitable casing 27 in which is mounted a vertical axis electro-magnet 28, positioned above the free end of an armature 29 which is pivoted at its left hand end as indicated by the numeral 30 and is equipped at its opposite end with a magnetically permeable button 31 opposed to the core of the electro-magnet 28 and on its under side with a stop shoulder 32 which is located at the longitudinally inward end of a cam surface 33. A stop 34 projecting under the armature 29 prevents the armature from falling to a too depressed position on being released by the electro-magnet 28. Below the armature 29 is a horizontal axis electro-magnet 35 which is opposed by a vertically arranged armature 36 located to the right of the electro-magnet 35 and pivoted at its lower end as indicated by the numeral 37, with a contractible spring 38 stretched between its upper end and the right hand wall of the casing as indicated by the numeral 39. The armature 36 has a magnetically permeable head 40 axially aligned with the core of the magnet 35 and above this head has a contact 41 for engagement with the stationary contact 42 which is supported above the magnet 35 in a position to be engaged by the contact 41 when the armature 36 is in an operated position. The armature 29 acts as a locking arm while the armature 36 acts as a movable contact element.

The battery 42 of the bus or the like has its ungrounded side connected by the wire 43 with one contact of the pull cord operated switch 25. This switch comprises a suitable casing 44 with the contacts 45 and 46 arranged in diametrically opposite positions to be engaged by the spring retracted contactor 47 working within the casing and having a rod connection 48 with the pull cord 26, so that when the pull cord is relaxed after operation the spring 49 on the rod connection will move the contactor 47 out of engagement with the contacts 45 and 46. The contact 45 of the switch 25 is connected by the wire 50 with one side of the winding of the electromagnet 35, the remaining side of this magnet's winding being grounded as indicated by the numeral 51. A branch 52 of the wire 43 connects with one side of the winding of the upper electromagnet 28 and this electro-magnet has its remaining side connected by the wire 53 with one side of each of the door switches 21 and 21' which have their remaining sides grounded as indicated by the numerals 55 and 55'. The door switches 21 and 21' may be of a conventional normally open type adapted to be released to closed position by the opening of the door corresponding thereto. Another branch 56 of the wire 43 connects with the movable contact element 36 to carry the battery current to the passenger informing signal bulb 15 in the signal 12 and also to the respective bulbs 57 and 57', of the driver informing signals 16 and 17, which have the ungrounded sides thereof connected to the main wire 58 from the stationary contact 42 by the branch wire 59, while the contactor armature 36 is in an operated position with the contact 41 engaging the contact 42, which position this armature assumes whenever the switch 25 is closed by pulling upon the cord 26.

In moving to the operated position the armature 36 engages its upper end with the cam surface 33 on the locking arm 29 and cams this locking arm upwardly until the engagement with the contact 42 is achieved. In this position the upper end of the armature 36 is behind the stop shoulder 32 of the locking arm and is thereby held in this position until the locking arm is retracted by the energization of the upper electromagnet 28 by the closing of one of the door switches. The door switches are adapted to be closed whenever one of the doors of the bus or the like is opened to permit a passenger to alight. As the door or doors return to closed position they reopen the respective switches 21 and 21', thereby permitting the locking arm 29 to fall into a position ready to be cammed out of the way again by operation of the armature 36 in the manner described, it being understood that as the locking arm 29 is retracted in the manner described, the spring 38 retracts the contact element 36 from the operated to the right hand inoperative position shown in Figure 2 of the drawings.

From the foregoing it will be evident that whenever a passenger wishing to alight pulls the signal cord 26, the passenger will be informed of the fact that the signal has reached the driver by the operation of the passenger informing signal 12, simultaneously with the operation of the driver informing signals 16 and 17, so that no anxiety on this point need be felt by the passenger. It is also evident that the signals mentioned stay "on" and only go "off" at such time as the bus or other conveyance is stopped and the door or doors opened to permit the signaling passenger to alight, and that the return of the door or doors to closed position after the stop has been made completely restores the system to initial position ready for another operation similar to that described above.

It will be evident that the pull cord 26 and the switch 25 may be located instead along the right hand side of the vehicle, or two such pull cords and switches provided one at each side of the passenger compartment.

Although I have shown and described herein a preferred embodiment of my invention, it is to be definitely understood that I do not desire to limit the application of my invention thereto, except as may be required by the scope of the subjoined claims.

Having described the invention, what is claimed as new is:

1. In a device for silently signaling a request by a passenger for the driver of a bus or the like to stop the bus to enable the passenger to alight, a driver informing visual silent signal, electrical means operable by the passenger to show such visual silent signal, a passenger informing visual silent signal connected to operate concurrently with said driver informing signal to assure the passenger that the driver has been signaled, means to maintain the signals in operation until at least one of the doors of the bus have been opened to permit the passenger to alight.

2. A silent electrical signal system for a bus or the like having at least one passenger exit door, said system comprising a stop request lamp mounted in the sphere of vision of the driver of the bus, a signal verifying lamp visible to the passengers, energizing switch means in circuit with both of said lamps and to be operated closed by passengers wishing to request the driver to stop the bus to permit them to leave the bus through one of the exit doors, both the stop request lamp and the signal verifying lamp being operated by the closing of said switch means whereby the passengers are positively informed that the stop request lamp is energized and to be seen by the driver, door operated switch means in circuit with both of said lamps, and holding means in circuit with the lamps and switch means, whereby opening of the door or doors subsequent to energization of the lamps effects deenergization of the lamps and closing of the door or doors restores the system to initial condition.

WILEY A. LANDRUM.